Feb. 5, 1946.    P. MARTINOTTI    2,394,460
AIRCRAFT PROPELLER
Filed Oct. 17, 1939    3 Sheets-Sheet 1
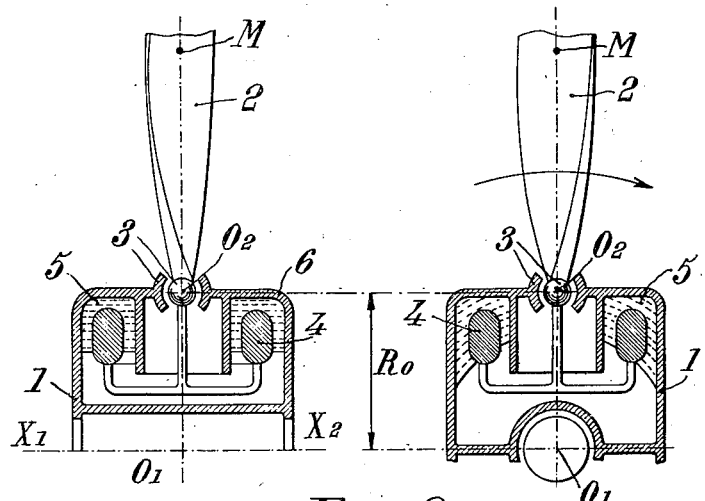
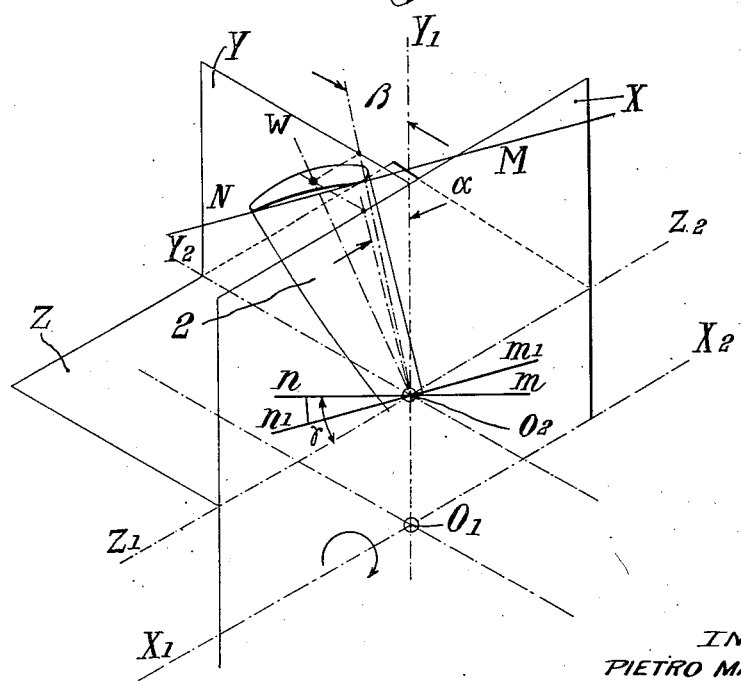
INVENTOR
PIETRO MARTINOTTI,
BY
ATTORNEYS Feb. 5, 1946. P. MARTINOTTI 2,394,460
AIRCRAFT PROPELLER
Filed Oct. 17, 1939 3 Sheets-Sheet 2

INVENTOR
PIETRO MARTINOTTI,

BY
ATTORNEYS

Feb. 5, 1946. P. MARTINOTTI 2,394,460
AIRCRAFT PROPELLER
Filed Oct. 17, 1939  3 Sheets-Sheet 3
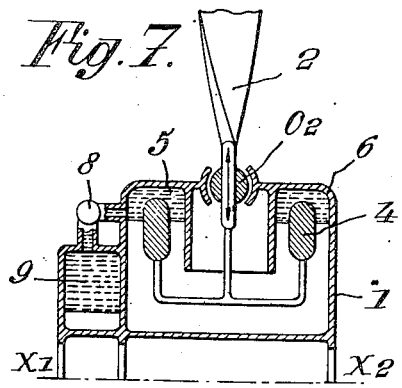
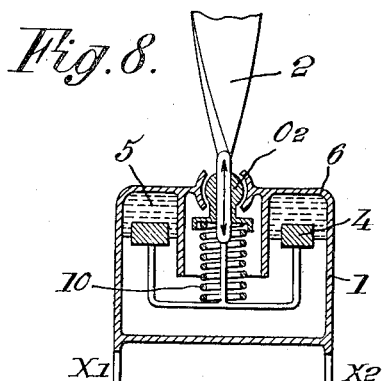
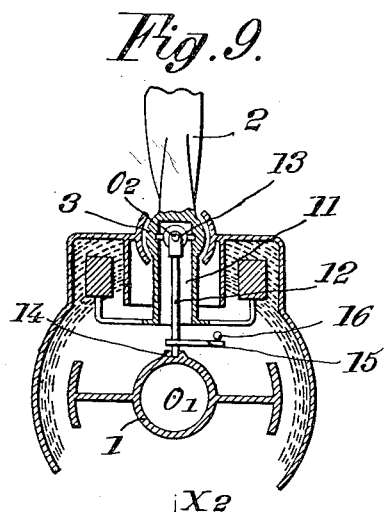
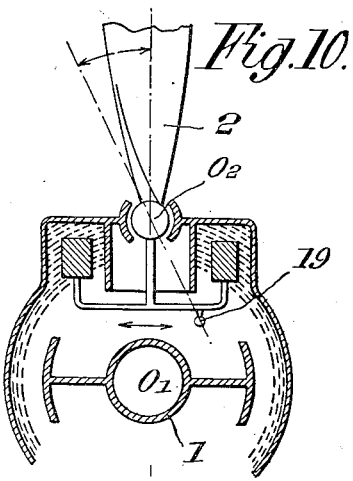
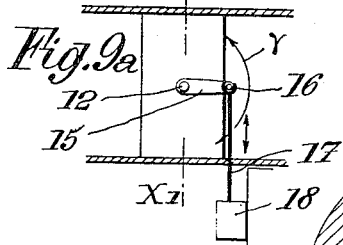
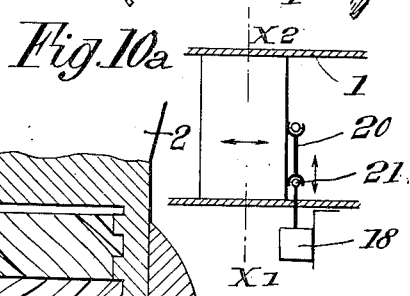
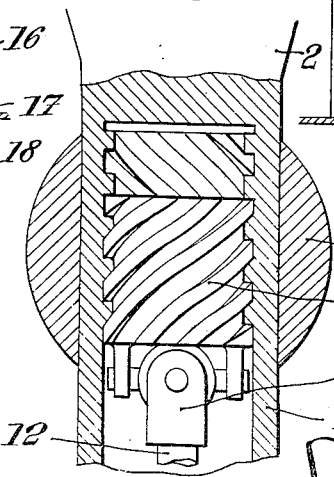
INVENTOR
PIETRO MARTINOTTI,
BY
ATTORNEYS Patented Feb. 5, 1946

2,394,460

UNITED STATES PATENT OFFICE 2,394,460

AIRCRAFT PROPELLER

Pietro Martinotti, Paris, France; vested in the Alien Property Custodian

Application October 17, 1939, Serial No. 299,879
In France July 4, 1939

1 Claim. (Cl. 170—164)

The present invention relates to rotary systems, such as the propellers of aircraft, which include elements associated with floats immersed in liquid, such as mercury, contained in vessels which rotate with the systems, in such manner that the floats balance, at least partly, by their hydrostatic action, the effects of such forces as centrifugal force, upon the said elements.

An imporant feature of the present invention consists in connecting together at least some of the liquid vessels of the system, these vessels being either directly interconnected or in communication with a compensating reservoir, and in providing means for connecting the elements to the body of the system in such a way that said elements can have certain radial displacements with respect to said body.

Another feature of the present invention, relating to systems of the type above described having oscillating elements, consists in locating the axis of rotation of the rotary system and the swivel connections of the inner parts of the elements with the body at a distance from each other.

According to another feature of the present invention, relating to systems of the type above mentioned including movable elements, in order to compensate for the torques which act on these elements and which tend to rotate the elements about their own longitudinal axes, I provide, in the floats which are to be associated with said elements, hollow parts or recesses arranged in such manner as to produce compensating hydrostatic effects.

Still another feature of the present invention, relating to the case in which the elements of the system are slidable in the radial direction so that their useful length can be varied, consists in obtaining this variation of useful length by varying the level of the liquid in the vessels, or by modifying the floating qualities of the floats associated with said elements.

Other features of the present invention will be apparent from the following detailed description of some specific embodiments thereof.

The preferred embodiments of the present invention hereinafter described, with reference to the accompanying drawings, are set forth merely by way of example.

In the drawings:

Fig. 1 is a diagrammatic axial view of the mounting of a propeller blade, according to the invention;

Fig. 2 is a transverse sectional view corresponding to Fig. 1;

Figure 4:
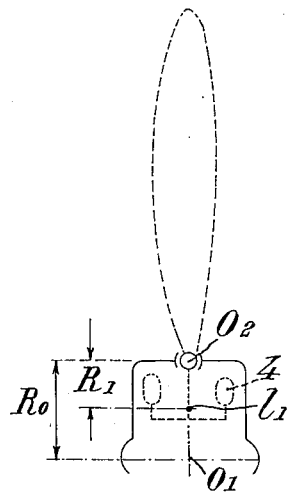
Figure 6:
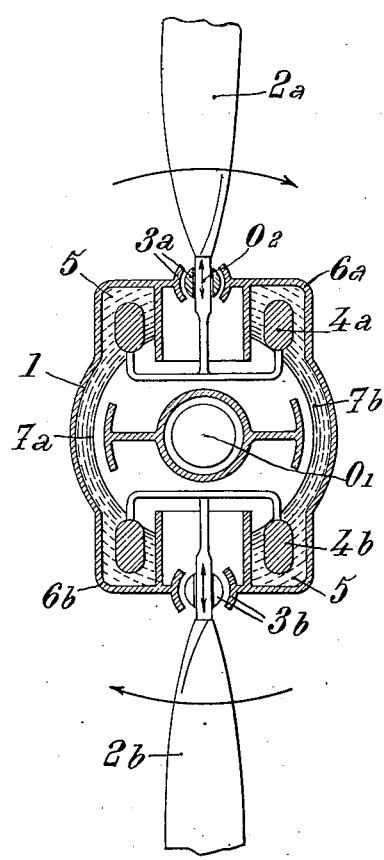
Figure 5:
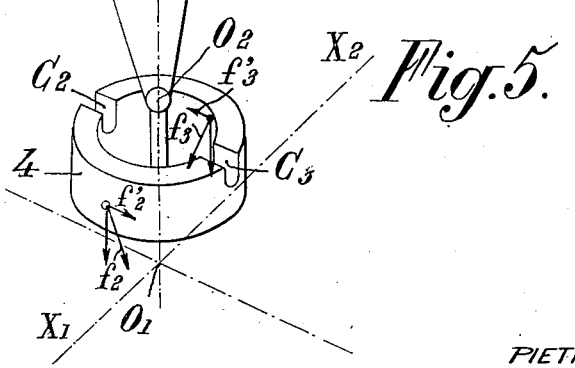

Figs. 3 to 5 inclusive are diagrams defining some parameters which will be hereinafter referred to;

Figs. 6 to 8 are diagrams illustrating other features of the invention as applied to oscillating blade propellers;

Fig. 9 is a diagrammatic sectional elevation view of a device for controlling the pitch of the blades of a propeller, according to the invention;

Fig. 9a is a diagrammatic transverse section corresponding to Fig. 9;

Fig. 10 is a view similar to Fig. 9 and corresponding to another embodiment of the present invention;

Fig. 10a is a diagrammatic transverse section corresponding to Fig. 10;

Fig. 11 is a sectional view, on an enlarged scale, of a mechanism for controlling the radial displacements of the blades of said propeller in accordance with the pitch variations.

In the following description, their is shown a propeller for an aircraft, having blades which are maintained against the action of centrifugal force by floats immersed in a liquid which is caused to rotate together with the propeller, said blades being, in the examples shown, adapted to oscillate on the inside of a cone the apex of which is at the point of articulation of the blade with the propeller hub.

This propeller, according to the present invention, includes a hub 1 on which the blades 2 are pivotally mounted through the medium of swivel joints 3 or the like.

The inner end of each blade 2 is provided with one or several floats 4 adapted to be immersed, when hub 1 is rotating, in the liquid 5 (preferably mercury) present in a chamber 6 provided for this purpose in said hub.

According to an important feature of the invention, the center $O_2$ about which blade 2 pivots is located at a distance from the axis of revolution $X_1X_2$ of hub 1.

In Fig. 3, I have shown a system of coordinates defining the elementary movements of blade 2, for clarifying the description.

Y designates a plane $Y_1O_2Y_2$ passing through $O_2$ and perpendicular to $X_1X_2$, said plane intersecting this last mentioned axis at $O_1$.

X designates a plane $Z_1O_2Y_1$ passing through the rotation axis $X_1X_2$ and perpendicular to plane Y.

Z designates a plane $Z_1O_2Y_2$ passing through $O_2$ and perpendicular to both of the above mentioned planes.

If, now, the axis $O_2W$ of the blade is projected on planes X and Y, I obtain two straight lines the angular coordinates $\alpha$ and $\beta$ of which determine the position of the blade axis in space.

It is then possible to define the variations of pitch of the propeller (that is to say the displacements of blade 2 about its axis $O_2W$) through the angular coordinate $\gamma$ of a straight line $mn$ which is the projection of a straight line $m^1n^1$ passing through $O_2$ and parallel to a chord MN of a blade section chosen as direction of reference. In the following description, angle $\gamma$ will be called the "angle of rotation of the blade in plane Z."

It will be readily understood that each of the blades 2 mounted, according to the invention, on a swivel 3 remote from the axis $X_1X_2$ can freely take a position determined by the action of the external forces on said blades.

As inclinations $\alpha$ and $\beta$ are without any substantial influence on the power and pull characteristics of the propeller, each blade 2 can be allowed freely to assume the position it occupies, in planes X and Y, under the action of said forces.

This freedom of the blade gives, in particular the following advantages: the bending stresses of said blade will be substantially reduced, which will allow reduction of its weight, and a suitable choice of the constructional parameters (shown by Fig. 4) of said blade (in particular distance $R_oR_t$ between $O_2$ and $O_1$, respectively, and the center of gravity $I_1$ of float 4, and also the masses of said floats) will permit of reducing the natural period of oscillation of the blade down to a value of the same order of magnitude as that of the cyclic irregularities of the driving shaft, blades 2 being thus free, at least partly, from the action of said cyclic irregularities.

If it is now necessary or desired to modify the pitch of such a propeller, it will be necessary to vary the angle $\gamma$ of each blade.

In order to produce variations of the value of the angle in question, it will be necessary to overcome the action of the torque due to the centrifugal forces which tends to pivot the blade about its axis.

Considering (Fig. 5) a section of the blade on which act the external forces capable of being broken down into two centrifugal forces $F_2$ and $F_3$ the projections of which on a plane $z$ parallel to Z are respectively shown at $F''_2$ and $F''_3$, and produce, with respect to the axis of the blade, an elementary torque which tends to rotate said blade about its axis, and considering then that the section that is considered is a mean section of the blade on which the whole mass of the latter has been concentrated, the torque produced by forces $F''_2$ and $F''_3$ will be the torque which tends to pivot the blade.

According to another feature of the present invention, this torque is compensated by providing, in floats 4, recesses $C_2$, $C_3$ such that, when they are filled by liquid 5, they produce, in the hydrostatic thrust of said float, a dissymmetry which involves the formation of a compensating torsional torque.

In other words, the arrangement is such that the remaining portions of the float are subjected to centrifugal thrusts $f_2f_3$ which are broken down, in a plane parallel to plane Z, into forces $f'_2$ and $f'_3$ such that their moment (with reference to the axis of the blade) is, at any time, of a value and a direction opposed to the corresponding value and direction of the torque components $F''_2$ and $F''_3$. In this way, the torque which tends to rotate the blades about their own axis will be balanced at any time.

Due to the important effect of the kinetic potential of the blades of an airscrew propeller, it is necessary to obtain a perfect balancing of the blades with respect to one another in such manner as to avoid any unbalanced mass.

According to a feature of the invention, illustrated by Fig. 6, this balancing is obtained, in the case of a propeller having several blades, such as 2a and 2b, by providing, between the chambers 6a and 6b in which are respectively located the floats 4a and 4b rigid with said blades, communications such that they permit the flow of the liquid 5 from one chamber into the other, the blades 2a and 2b being mounted in such manner as to be radially slidable.

For this purpose, for instance, I connect chambers 6a and 6b together through channels 7a and 7b arranged below the cylindrical float surface, and I provide the swivel joints 3a and 3b with radial bores which permit radial displacements of the blades with respect to the axis of revolution.

It will be readily understood that, due to the interconnection of the chambers of the various blades, the level of the carrier liquid is in the form of a cylindrical surface the center of which is not on the geometrical axis of the hub but on on the instantaneous rotation axis of the whole of the propeller.

In other words, a constant or variable lack of centering in the rotation of the propeller carrying shaft will have no detrimental effect on the concentricity of the blades 2 and of their axis of rotation. Furthermore, an increase of mass, or of centrifugal radical external reaction between two blades will be automatically compensated by a transfer of a suitable amount of the carrier liquid from a chamber into the other, due to the greater immersion of the float of greater weight, and inversely.

It should be noted that the same automatic balancing effect would be obtained in the case of a propeller having a single blade by causing the chamber which corresponds to the blade to coact with an opposed chamber of the same bore.

Thus, an accurate dynamic balancing will be permanently obtained, whatever be the static or dynamic lack of balance of the elements which constitute the propeller, and despite periodical irregularities of rotation of the propeller carrying shaft.

Then, advantageously, when the propeller blades are slidably mounted in their swivel supports, which is of particular importance in the case of a propeller in which the balancing is obtained by intercommunication between the chambers, this possibility of radial displacement of blades 2 can be utilized for varying the diameter of the propeller.

For this purpose, according to the invention, I provide means for varying the level of liquid 5 in chambers 6.

Or, according to another embodiment, I provide means for modifying the floating qualities of floats 4.

The first of these solutions can be obtained, for instance, as shown by Fig. 7, by causing to coact with chambers 6 a pump 8 which provides transfer of a certain amount of liquid 5 from said chambers toward an auxiliary chamber 9, which constitutes a reservoir, or, inversely, from said reservoir toward chambers 6, the first of these operations producing an increase of the diameter of the propeller and the second a reduction thereof.

The second solution can be carried out, for instance, as shown by Fig. 8.

In this case, float 4 is made of a size insufficient for producing the full support of the blade, and the preponderating action of the centrifugal force over the hydrostatic reaction of the float is compensated by an elastic device such, for instance, as a spring 10.

In this embodiment, any variation of the number of revolutions of the propeller will automatically produce a corresponding variation of its diameter, and it will be possible, through a suitable choice of the characteristic parameters of the abutment system of each blade, to arrange that the automatic variations of diameter take place according to a suitable law.

In the preceding description, I have not mentioned means, either automatic or controlled at will, for producing variations of angle γ, that is to say of the pitch of the propeller.

If it is desired, for instance, to place this angle under the action of a mechanism, either automatic or operated at will, while maintaining the freedom of rotation of each blade in planes X and Y, and, eventually, the freedom of radial sliding, I may make use of the embodiment of Figs. 9 and 9a.

According to this embodiment, the inner end of each blade is hollowed out and the housing 11 thus accommodates a control shaft 12 one end of which is connected to blade 2 by a Cardan or similar joint 13, with, possibly, a sliding element, the center of which is preferably made to coincide with the center of swivelling $O_2$ of the blade that is considered.

The other end of said shaft is kept connected to the hub 1 of the propeller, with an articulation 14.

I provide a device for controlling shaft 12 of such nature that the shaft 12 may rotate with the propeller while being controlled. This is done, for instance, by fixing on the side of shaft 12, a lever 15 carrying a crank pin 16 connected through a rod 17 with a servo-motor 18 placed either under the direct control of the pilot or under that of any automatic mechanism.

I may also, according to another feature of the invention, produce the automatic pitch variation by making use of unbalancings as may occur between the forces applied to the blade.

It has already been suggested to pivot each blade of a propeller about an axis making an angle with the radii passing respectively through the center of gravity and the center of aerodynamic pressure of the blade.

The moments, with respect to this axis, of the aerodynamic and centrifugal forces, acting in opposite directions, then balance each other and any relative variation of these forces, as a function of variations of the conditions of use (speed of rotation, forward speed, density of air, etc.) produces a variation of the pitch of the propeller.

In the case of a propeller made according to the present invention, such operating conditions will be obtained by providing, as shown by Figs. 10 and 10a, at a suitably chosen point of blade 2, a second swivel articulation 19, and compelling this joint to move only in a plane perpendicular to the axis of rotation $X_1X_2$.

This will correspond in fact to materializing an axis pasing through joint 19 and $O_2$, and about which the pivoting of the blade must take place.

For this purpose, I connect swivel 19 with a connecting rod 20, itself fixed to hub 1 through a swivel 21.

Owing to a suitable designing and dimensioning of these elements, it is possible to obtain a propeller the automatic variation of pitch of which takes place in accordance with a law corresponding to the requirements of practice. However, it will be possible to modify at will, eventually while in flight, the conditions of equilibrium of the blade, and, therefore its pitch, either by modifying the length of connecting rod 20 or by producing a translatory movement of swivel joint 20 parallel to the axis of rotation of the propeller.

It is further possible, in order to make automatic the variation of the pitch of the propeller, to dimension recesses $C_2$ and $C_3$ (Fig. 5) in such manner that the compensating torque they produce for increasing the pitch of the propeller is greater than the opposed torque produced by the blade. Then this difference is compensated by an elastic resistance.

The balancing of the blade being obtained for a given speed of revolution of the propeller, any increase of the speed will produce an increase of the pitch and inversely.

With such an arrangement, I obtain an automatic propeller of the "constant speed" type, but it will remain possible to act, through any known means, on the tension of the spring and thus to adjust the conditions of automaticity.

Finally, it is possible, in the case of a propeller of variable diameter, to obtain an automatic variation of the pitch, by causing any variation of diameter of the propeller to correspond to a variation of the pitch.

For this purpose, it is possible, advantageously, to provide, as shown by Fig. 11, in the recessed portion 11 of blade 2, a shaft 12 provided at its outer end with a Cardan joint 13, connected to blade 2 by means of a piece 13b provided with helical external grooves coacting with similar internal grooves provided in blade 2.

In this way, I obtain an automatically variable pitch and diameter propeller which can however be controlled in flight by turning shaft 12, as above explained.

Whatever be the particular embodiment that is chosen, the advantages and operation of the variable pitch propeller according to the invention result sufficiently clearly from the above description for making it unnecessary to enter into further explanations.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claim.

What I claim is:

In an aircraft propeller construction, a hub in the form of a hollow shell adapted to be mounted upon the propeller shaft and to provide the individual mounting means for a plurality of propeller blades, said shell having an annular recess about each point of attachment of a blade with the recess open in the direction toward the axis of the hub and with all of the recesses being connected by a central substantially cylindrical portion of the hub, and a plurality of propeller blade assemblies mounted on the hub each of which includes a blade attached by a blade adjusting means which comprises, a universal swivel connection formed by a ball-and-socket joint with a ball through which the blade slidably extends and with the socket formed by an annular groove portion surrounding the ball and integral with the hub, and a plurality of floats attached to the propeller blade on the inside of said hub and adapted to move the blade along the axis of the blade in accordance with the position of liquid in the annular recess and to simultaneously adjust the pitch of the blade.

PIETRO MARTINOTTI.